United States Patent [19]

Colvert

[11] Patent Number: 5,024,730
[45] Date of Patent: Jun. 18, 1991

[54] CONTROL SYSTEM FOR DELAYED COKER

[75] Inventor: James H. Colvert, Houston, Tex.

[73] Assignee: Texaco Inc., White Plains, N.Y.

[21] Appl. No.: 534,808

[22] Filed: Jun. 7, 1990

[51] Int. Cl.$^5$ ............................................. B01D 3/42
[52] U.S. Cl. .................................. 196/132; 202/253;
202/270; 208/131; 208/DIG. 1
[58] Field of Search ......... 196/132; 208/131, DIG. 1;
202/227, 241, 253, 270; 422/108

[56] References Cited

U.S. PATENT DOCUMENTS

| | | | |
|---|---|---|---|
| 3,936,358 | 2/1976 | Little | 202/227 |
| 4,168,224 | 9/1979 | Jansma | 208/131 |
| 4,634,500 | 1/1987 | Elliott et al. | 202/227 |
| 4,929,339 | 5/1990 | Elliott et al. | 208/131 |

*Primary Examiner*—Joye L. Woodard
*Attorney, Agent, or Firm*—Jack H. Park; Kenneth R. Priem; Richard A., Morgan

[57] ABSTRACT

A system controls a delayed coker in which a heavy liquid hydrocarbon feedstock is thermally decomposed to a solid coke product in a cyclical process. When the coking portion of the cycle is completed, the coke in the drum is cooled by quench water, and the quench water is then passed from the coke drum through a manifold to a drain conduit. Hot vapor is passed through the coke drum, via the same manifold to warm the coke drum. A temperature controller, valve actuator and ball valve allow passage of vapor to the coker fractionator at a manifold temperature at which all water is in the vapor state. Manifold temperatures at which liquid water may exist causes the ball valve to close, preventing liquid water from flowing into the coker fractionator. Upset of the coker fractionator is prevented.

3 Claims, 1 Drawing Sheet

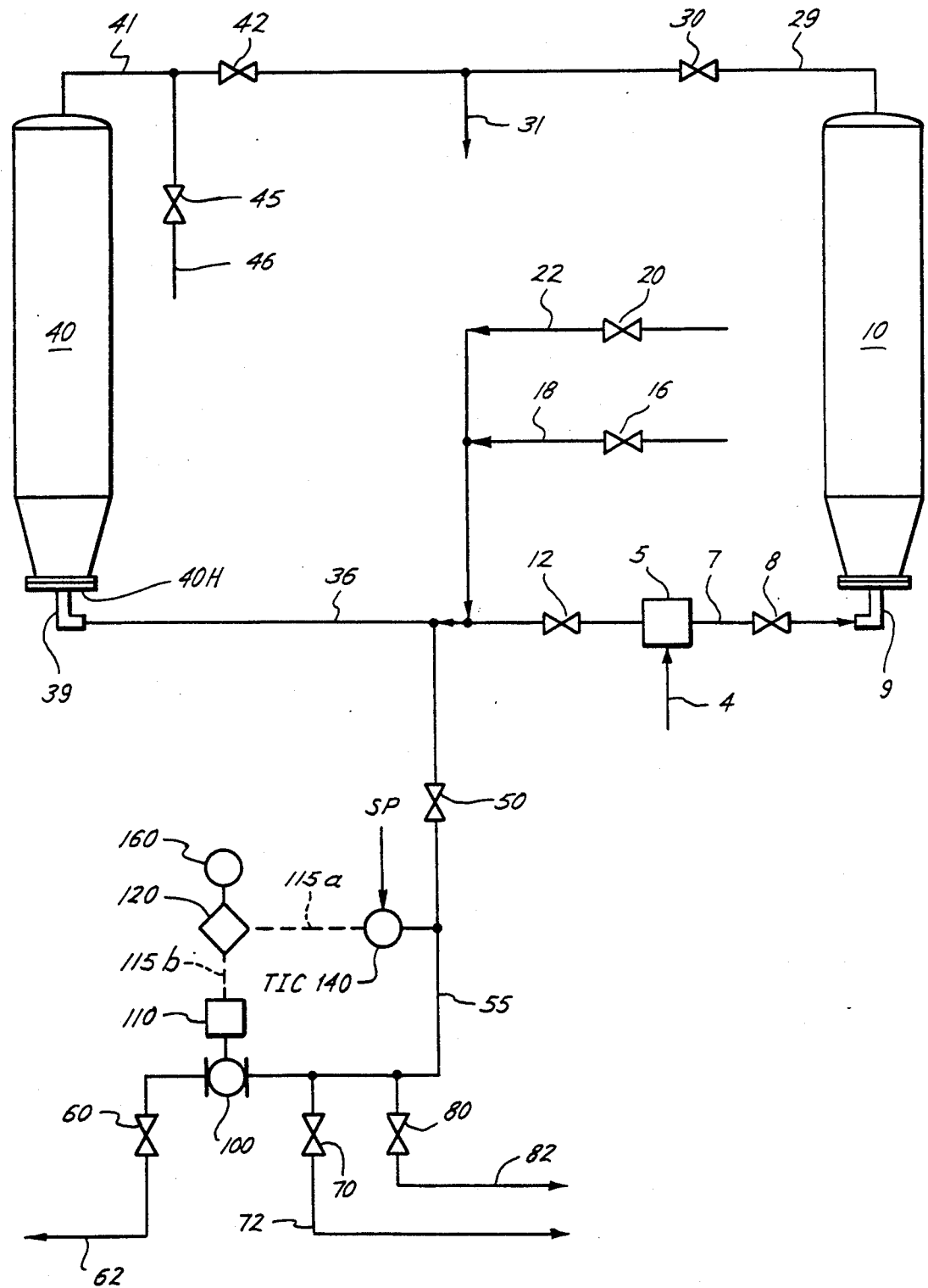

CONTROL SYSTEM FOR DELAYED COKER

BACKGROUND OF THE INVENTION

1. Field Of The Invention

The invention relates to a control system for operating a delayed coker apparatus in the process of converting a heavy liquid hydrocarbon feedstock to gaseous products, distillate liquid products and a solid coke product.

2. Description Of Relevant Methods In The Field

The delayed coking process is well-known in the petroleum refining arts for thermally decomposing a heavy liquid hydrocarbon to a solid coke product. The process is used primarily as a means of disposing of low value vacuum resids which are a minor fraction of full boiling range petroleum. The preferred products are hydrocarbon gas and distillate liquids. The resulting coke is a low value by-product. The value of this by-product is calculated based on the fuel value of the coke and the sulfur and heavy metal impurities which are transferred from the heavy hydrocarbon feedstock to the coke.

In the delayed coking process a feedstock such as a heavy, sour vacuum resid containing heavy metals is introduced to the bottom portion of a coker fractionator. The fractionator bottoms is then passed through a furnace to heat the bottoms to coking temperature and then to one of two coke drums. The hot hydrocarbon is retained in the coke drum at a temperature and pressure for a period of time to convert the liquid hydrocarbon to coke.

The two coke drums are operated cyclically. While one drum is being filled and coked, the other drum is emptied and readied for another filling. The coke emptying portion of the cycle involves steaming the coke with medium pressure steam to remove volatile hydrocarbon liquids and gases. Then the coke is cooled with quench water. The cooled coke is next hydraulically cut with high pressure water. The cut coke is removed from the coke drum to a coke pit and coke dewatering pad. Finally, the coke drum is heated with vapor from the other coke drum. The hydrocarbon and steam effluent from the heating coke drum is removed to a closed blowdown system. When the coke drum effluent reaches 350° F. it is switched to the coker fractionator for hydrocarbon recovery.

U.S. Pat. No. 4,455,219 to H. R. Janssen et al. issued June 19, 1984 describes a delayed coking process which is typical of the commercial refining industry. This patent teaches the essential process parameters of the delayed coking process and is incorporated herein by reference.

SUMMARY OF THE INVENTION

The invention is a control system for a delayed coker apparatus. The control system prevents the flow of liquid water into the coker fractionator, which would cause considerable fractionator upset and possible equipment damage.

The delayed coker apparatus is used for carrying out the delayed coker process in which a heavy liquid hydrocarbon feedstock is converted at coking temperatures and pressures to a solid coke product and liquid and vapor hydrocarbon products.

The essential vessels in the delayed coker apparatus are a coke drum and a coker fractionator. A coke drum conduit in the bottom head and a feedstock conduit provide fluid communication with the coke drum. These are the primary conduits for the passage of first feedstock and subsequently steam and quench water into the coke drum. The conduit also accommodates the removal of hydrocarbons, water, condensate and steam.

A manifold is in fluid communication with the coke drum conduit by way of the feedstock conduit and accommodates the removal of fluids from the coke drum. Drain conduit means is in fluid communication with the manifold and provides for the removal of fluids from the manifold. A coker fractionator conduit provides fluid communication between the manifold and the coker fractionator.

The control system prevents the flow of liquid water into the coker fractionator. With this control system liquid water in the manifold is removed via the drain conduit means. Liquid water passed to the fractionator would cause considerable upset and possible equipment damage.

In the control system, a temperature sensor is positioned in the manifold to sense the temperature of fluids and transmit a signal corresponding to this temperature.

An on/off valve is positioned between the manifold and the coker fractionator conduit. A valve actuator operates to adjust the on/off valve between the fully open and fully closed positions.

A comparing means receives both a set point signal and the actual temperature signal from the temperature sensor and transmitter. Comparing means impresses a signal into the valve actuator to activate the on/off valve to a fully closed position in response to an actual temperature less than the set point temperature.

A set point temperature at which liquid water cannot exist at manifold pressure is selected from the Steam Tables. At actual temperatures below the set point temperature, liquid water is prevented from flowing into the fractionator. Comparing mean impresses a signal into the valve actuator to actuate the on/off valve to the fully closed position. At actual temperature above the selected set point temperature, only water in the vapor state can exist. Comparing means impresses a signal into the valve actuator to actuate the on/off valve to the fully open position permitting flow to the fractionator.

DETAILED DESCRIPTION OF THE DRAWING

The drawing is a schematic representation of a control system in accordance with the invention for preventing liquid water from entering the fractionator from the coke drum in a delayed coking process apparatus.

In the drawing are coke drums 10 and 40 which are mechanically similar. Coke drums 10 and 40 are operated cyclically. In the cycle, one coke drum is filled with heated, heavy liquid hydrocarbon feedstock and coked at coking temperatures and pressures thereby decomposing the liquid hydrocarbon to solid coke along with liquid and vapor hydrocarbon coproducts. At the same time the other coke drum is emptied of coke and readied for refilling.

In this representation, coke drum 10 is being filled with feedstock. Block valve 8 is open. Block valve 12 is closed. Feedstock from coker fractionator (not shown) bottoms is passed via line 4, three-way valve 5, line 7 and open block valve 8 through coke drum conduit 9 into coke drum 10. Hot, gaseous product passes from the top of coke drum 10, through line 29, open block valve 30 and via line 31 to coker fractionator (not shown).

Coke drum 40 is full of hot, solid coke and hydrocarbon vapors. The coke removal procedure is carried out as follows:

First, coke drum 40 is steamed to remove hydrocarbon vapors. Block valve 50 is closed. Block valve 45 is closed. Block valve 42 is open. Block valve 16 is opened. Steam is passed via steam conduit 18, feedstock conduit 36 and coke drum conduit 39 into coke drum 40. The steam forces volatile hydrocarbons to the top of coke drum 40, through open block valve 42, line 41 and line 31 to coker fractionator (not shown). This alignment is maintained for about one hour.

Second, the coke drum is quenched with water. Block valve 42 is closed. Block valve 45 is opened to allow flow via line 46 to closed blowdown system (not shown). Block valve 20 is opened. Block valve 16 is closed. Quench water is flowed through block valve 20, quench water line 22, feedstock conduit 36 and coke drum conduit 39 into coke drum 40. Quench water flow continues until the water level is above the coke and most of the available volume of coke drum 40 is filled. This quench water cools the coke drum from about 800° F. to about 200° F., in approximately four hours.

Third, quench water is drained from the coke drum. Block valves 16 and 20 are closed. Block valves 60 and 70 are closed. Block valve 45 is closed. Block valve 12 remains closed. Block valve 50 and block valve 80 are both opened. Quench water is passed under the force of gravity out of coke drum 40, through coke drum conduit 39, feedstock conduit 36 through open block valve 50 to manifold 55. This quench water flows in manifold 55, via open block valve 80 through drain conduit 82 to coke pit and dewatering pad (not shown).

The third step is critical. Following the cooling of the coke by the quench water, if the operator inadvertently opened valve 60 instead of valve 80 and the control system were not in place, large quantities of liquid water would flow through open block valve 60 and fractionator conduit 62 to the coker fractionator (not shown). A portion of this water would instantaneously vaporize at the fractionator bottom temperature (about 700° F.). This could cause a severe upset of the coker fractionator and could cause damage to the fractionator. The control system prevents the flow of liquid water from manifold 55 into the fractionator. Even if the operator were to open valve 60 instead of valve 80 to drain the quench water, the control system would prevent water to flow into the fractionator.

Fourth, coke is hydraulically cut from the coke drum. The bottom head 40H and coke drum conduit 39 are removed to pass coke directly from drum 40 to coke pit and coke dewatering pad (not shown). High pressure water (not shown) cuts the coke from coke drum 40. Cut coke and water flow to coke pit and coke dewatering pad (not shown). Bottom head 40H and coke drum conduit 39 are reinstalled.

Fifth, the coke drum is heated to make ready for feedstock. Block valve 50 is opened. Block valve 70 is opened. Block valve 30 is open. Block valves 60 and 80 are closed. Block valve 42 is opened. A small amount of hot hydrocarbon vapor is passed from coke drum 10, via line 29, open block valve 30, open block valve 42 and line 41 to coke drum 40. A mixture of hydrocarbon vapor, steam vapor and condensate passes through coke drum conduit 39, feedstock conduit 36, block valve 50, manifold 55, open block valve 70 and drain conduit 72 to a closed blowdown system (not shown). This procedure continues until coke drum 40 is heated to about 350° F. This temperature is well above the temperature at which water is present in the liquid phase. This avoids liquid water being passed to the fractionator in the switch to the sixth step.

Sixth, block valve 70 is closed and block valve 60 is opened, causing all vapor and condensate to flow from coke drum 40 via open block valve 60 through coker fractionator conduit 62 to the coker fractionator (not shown) for recovery.

On/off valve 100, in the preferred embodiment a ball valve is positioned at the entry point of coker fractionator conduit 62. Valve actuator 110 is attached to on/off valve 100 by means to adjust it either fully open or fully closed. Valve actuator 110 receives a signal 115b from temperature sensor, controller and transmitter TIC-140. TIC-140 is positioned to sense the temperature of fluid in manifold 55. TIC-140 also accepts a set point SP. The controller portion of TIC-140 is a comparing means which determines if the actual temperature inside manifold 55 is below the set point SP temperature. In this event, TIC-140 transmits signal 115a to AND gate 120. AND gate 120 transmits signal 115b to valve actuator 110 to fully close on/off valve 100.

When the process technician makes the alignment to route vapor from coke drum 40 via coker fractionator conduit 62 to the fractionator, he closes block valves 70 and 80 and opens block valve 60. He then actuates manually operated switch 160. Manually operated switch 160 is optional. Manually operated switch 160 is integrally connected to AND gate 120.

In order for AND gate 120 to transmit signal 115b to valve actuator 110, two conditions must be met. First, the signal 115a from TIC-140 must indicate that fluid temperature in manifold 55 is greater than or equal to set point SP temperature. Second, manually operated switch 160 must be actuated. On the occurrence of both conditions, AND gate 120 transmits signal 115b to valve actuator 110 to fully open on/off valve 100.

In the control system, the set point temperature is set at or greater than the temperature at which liquid water can exist in manifold 55. This temperature is found in the Steam Tables, *Perry's Chemical Engineers' Handbook*, 4th ed., pp. 3-192 to 3-195. At a typical manifold 55 pressure of about 20 psig (34.7 psia) at 265° F., only vapor water exists. Accordingly, a set point of 265° F. satisfies the requirement that no liquid water pass to the fractionator. In actual practice in the petroleum refining industry a margin of safety is incorporated. For example, a set point of 300° F. or 350° F. assures the process technician that only vapor state water will flow from manifold 55 into the fractionator.

In the best mode contemplated by inventor, on/off valve 100 is a ball valve, set point temperature is 350° F. at a manifold pressure of 20 psig and TIC-140 signal 115a is passed to an AND gate which sends a signal 115b to actuate the ball valve fully open only with the activating of a manual hand switch (manually operated switch 160). The manual hand switch is a redundancy that provides an additional margin of safety.

While the primary benefit of the control system is to prevent flow of drained quench water from the coke drum to the coker fractionator, this system also presents inadvertent routing of the combined product from warming the drum to the fractionator before the temperature in the manifold reaches the set point temperature. While this combined product will have a much smaller amount of liquid water potentially present, it could still cause an upset in the fractionator if sent to the fractionator at too low a temperature with liquid water present.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. A control system in combination with a delayed coker apparatus in which a heavy liquid hydrocarbon feedstock is converted to solid coke and fluid hydrocarbons in a coke drum and from which coke drum coke and fluid hydrocarbons are removed, said coker apparatus comprising:

the coke drum,
a manifold connected to said coke drum,
a coker fractionator conduit connected to said manifold for providing the flow of fluids from said manifold to a coker fractionator,
said control system comprising, a temperature sensor and transmitter positioned to sense the temperature of fluids in said manifold and to transmit a temperature signal corresponding thereto,
a valve means positioned to regulate fluid flow in said coker fractionator conduit,
a valve actuator being operable to adjust said valve means between fully open and fully closed positions,
comparing means for receiving a set point temperature and said temperature signal, being operable to impress a comparing means signal into said valve actuator for activating said valve means to the fully closed position in response to a temperature less than said set point temperature.

2. The control system of claim 1, including a manually operated on/off switch providing a signal to an AND gate wherein said comparing means impresses said comparing means signal into said AND gate and said AND gate impresses said comparing means signal into said valve actuator 3. A control system in combination with a delayed coker apparatus in which a heavy liquid hydrocarbon feedstock is converted to solid coke and fluid hydrocarbons in a coke drum and from which coke drum coke, fluid hydrocarbons and water are removed, said coker apparatus comprising:

the coke drum,
a manifold connected to said coke drum,
a coker fractionator conduit connected to said manifold for providing the flow of fluids from said manifold to a coker fractionator,
said control system comprising, a temperature sensor and transmitter positioned to sense the temperature of fluids in said manifold and to transmit a temperature signal corresponding thereto,
a valve means positioned to regulate fluid flow in said coker fractionator conduit,
a valve actuator being operable to adjust said valve means between fully open and fully closed positions,
comparing means for receiving a set point temperature and said temperature signal, being operable to impress a comparing means signal into said valve actuator for activating said valve means to the fully closed position in response to a temperature less than said set point temperature,
said set point temperature selected at a temperature above the temperature at which water can exist in the liquid state in the manifold, the control system thereby preventing the flow of liquid water into the coker fractionator by way of the coker fractionator conduit.

* * * * *